(12) United States Patent
Wang

(10) Patent No.: US 11,019,635 B2
(45) Date of Patent: *May 25, 2021

(54) METHOD AND DEVICE FOR BEAM FAILURE RECOVERY

(71) Applicant: BEIJING SPREADTRUM HI-TECH COMMUNICATIONS TECHNOLOGY CO., LTD., Beijing (CN)

(72) Inventor: Hualei Wang, Shanghai (CN)

(73) Assignee: BEIJING UNISOC COMMUNICATIONS TECHNOLOGY CO., LTD., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/581,988

(22) Filed: Sep. 25, 2019

(65) Prior Publication Data

US 2020/0022152 A1 Jan. 16, 2020

Related U.S. Application Data

(63) Continuation of application No. 15/855,336, filed on Dec. 27, 2017, now Pat. No. 10,582,514.

(30) Foreign Application Priority Data

Mar. 24, 2017 (CN) .......................... 201710181786.5

(51) Int. Cl.
*H04W 72/08* (2009.01)
*H04B 7/06* (2006.01)
(Continued)

(52) U.S. Cl.
CPC ........ *H04W 72/085* (2013.01); *H04B 7/0639* (2013.01); *H04B 7/0695* (2013.01);
(Continued)

(58) Field of Classification Search
None
See application file for complete search history.

(56) References Cited

U.S. PATENT DOCUMENTS

2005/0243940 A1* 11/2005 Huh .................... H04L 25/0226
375/260
2010/0189189 A1* 7/2010 Hoshino .............. H04B 7/0617
375/267

(Continued)

OTHER PUBLICATIONS

USPTO Final Office Action corresponding to U.S. Appl. No. 15/855,336; dated Jul. 3, 2019.
(Continued)

*Primary Examiner* — Hong S Cho
(74) *Attorney, Agent, or Firm* — Cantor Colburn LLP

(57) ABSTRACT

A method and a device for beam failure recovery are provided. The method includes determining signal quality of a designated beam being out of a required range of control channel transmission, where the designated beam is designated by a network for control channel transmission; performing a beam measurement to determine a plurality of recommended beams, where signal quality of the plurality of recommended beams is within a preset range; and reporting beam identifications of the plurality of recommended beams to the network, so that the network can change the designated beam based on the plurality of recommended beams. The method and device can increase a success rate of beam failure recovery.

22 Claims, 3 Drawing Sheets

(51) Int. Cl.
*H04W 72/04* (2009.01)
*H04W 72/10* (2009.01)

(52) U.S. Cl.
CPC ...... *H04W 72/046* (2013.01); *H04W 72/0453* (2013.01); *H04W 72/10* (2013.01)

(56) References Cited

U.S. PATENT DOCUMENTS

| | | | |
|---|---|---|---|
| 2014/0055302 A1* | 2/2014 | Jia | H04B 7/0695 |
| | | | 342/372 |
| 2015/0236772 A1* | 8/2015 | Hammarwall | H04L 5/0048 |
| | | | 370/329 |
| 2016/0219611 A1* | 7/2016 | Jo | H04W 72/1231 |
| 2016/0353510 A1* | 12/2016 | Zhang | H04B 7/0617 |
| 2018/0042000 A1* | 2/2018 | Zhang | H04W 72/042 |
| 2018/0310283 A1* | 10/2018 | Deenoo | H04W 72/046 |
| 2018/0323856 A1 | 11/2018 | Xiong et al. | |
| 2018/0351624 A1* | 12/2018 | Hakola | H04B 7/0617 |

OTHER PUBLICATIONS

USPTO Non-Final Office Action corresponding to U.S. Appl. No. 15/855,336; dated Feb. 14, 2019.

\* cited by examiner

METHOD AND DEVICE FOR BEAM FAILURE RECOVERY

CROSS-REFERENCE TO RELATED APPLICATIONS

This application is a Continuation Application of U.S. patent application Ser. No. 15/855,336, filed on Dec. 27, 2017, which claims the benefit of priority to Chinese Patent Application No. 201710181786.5, filed on Mar. 24, 2017, the entire disclosure of which are incorporated herein by reference.

TECHNICAL FIELD

The present disclosure relates to communication technology field, and more particularly, to a method and a device for beam failure recovery.

BACKGROUND

In order to ensure a normal communication process, a beam pair alignment should be performed between a user equipment (UE) and a network. However, due to channel fluctuation, a suddenly block of a communication link, UE rotation and other factors, the beam pair may be out of alignment, which will affect system performance.

Without performing a beam failure recovery will result in wireless link failure and more latency. A success rate of existing beam failure recovery methods needs to be improved.

SUMMARY

In order to improve a success rate of beam failure recovery, a method for beam failure recovery is provided according to embodiments of the present disclosure. The method may include: determining signal quality of a designated beam being out of a required range of control channel transmission, where the designated beam is designated by a network for control channel transmission; performing a beam measurement to determine a plurality of recommended beams, where signal quality of the plurality of recommended beams is within a preset range; and reporting beam identifications of the plurality of recommended beams to the network so that the network can change the designated beam based on the plurality of recommended beams.

Optionally, reporting the beam identifications of the plurality of recommended beams to the network may include: encoding and modulating the beam identifications to obtain beam failure recovery request information; and transmitting the beam failure recovery request information to the network.

Optionally, the beam failure recovery request information may include control information or data information, and transmitting the beam failure recovery request information to the network may include transmitting the beam failure recovery request information through a control channel or a data channel.

Optionally, reporting the beam identifications of the plurality of recommended beams to the network may include: determining a plurality of recommended beam signal sequences based on the beam identifications of the plurality of recommended beams; and transmitting the plurality of recommended beam signal sequences to the network.

Optionally, determining the plurality of recommended beam signal sequences based on the beam identifications of the plurality of recommended beams may include: cyclically shifting a preset signal sequence to obtain a plurality of shift signal sequences, where different shift signal sequences correspond to different recommended beams; and mixing the plurality of shift signal sequences to obtain the plurality of recommended beam signal sequences.

Optionally, determining the plurality of recommended beam signal sequences based on the beam identifications of the plurality of recommended beams may include: determining a plurality of signal sequences as a plurality of recommended beam signal sequences, where there is a one-to-one correspondence between the plurality of signal sequences and the beam identifications of the plurality of recommended beams, and different signal sequences correspond to different beam identifications of the plurality of recommended beams.

Optionally, transmitting the plurality of recommended beam signal sequences to the network may include any of: transmitting the plurality of signal sequences corresponding to the beam identifications of the plurality of recommended beams sequentially in a time domain; and transmitting the plurality of signal sequences corresponding to the beam identifications of the plurality of recommended beams alternately in the time domain.

Optionally, transmitting the plurality of recommended beam signal sequences to the network may include any of: transmitting the plurality of signal sequences corresponding to the beam identifications of the plurality of recommended beams sequentially in a frequency domain; and transmitting the plurality of signal sequences corresponding to the beam identifications of the plurality of recommended beams alternately in the frequency domain.

Optionally, the plurality of signal sequences corresponding to the beam identifications of the plurality of recommended beams may include at least one of root sequences and sequences generated by root sequences.

Optionally, the beam identifications may include beam indexes.

Optionally, a priority order may be set among the plurality of recommended beams.

A device for beam failure recovery is also provided according to embodiments. The device may include a quality determining circuitry, configured to determine signal quality of a designated beam being out of a required range of control channel transmission, where the designated beam is designated by a network for control channel transmission; a beam measuring circuitry, configured to perform a beam measurement to determine a plurality of recommended beams, where signal quality of the plurality of recommended beams is within a preset range; and a reporting circuitry, configured to report beam identifications of the plurality of recommended beams to the network so that the network can change the designated beam based on the plurality of recommended beams.

Optionally, the reporting circuitry may include a beam failure recovery request information generating circuitry, configured to encode and modulate the beam identifications to obtain beam failure recovery request information; and an information transmitting circuitry, configured to transmit the beam failure recovery request information to the network.

Optionally, the beam failure recovery request information may include control information or data information, and the reporting circuitry is configured to transmit the beam failure recovery request information to the network through a control channel or a data channel.

Optionally, the reporting circuitry may include: a recommended beam signal sequence generating circuitry, configured to determine a plurality of recommended beam signal sequences based on the beam identifications of the plurality of recommended beams; and a sequence transmitting circuitry, configured to transmit the plurality of recommended beam signal sequences to the network.

Optionally, the recommended beam signal sequence generating circuitry may include: a cyclic shift circuitry, configured to cyclically shift a preset signal sequence to obtain a plurality of shift signal sequences, where different shift signal sequences correspond to different recommended beams; and a mixing circuitry, configured to mix the plurality of shift signal sequences to obtain the plurality of recommended beam signal sequences.

Optionally, the recommended beam signal sequence generating circuitry is configured to determine a plurality of signal sequences as the plurality of recommended beam signal sequences, where there is a one-to-one correspondence between the plurality of signal sequences and the beam identifications of the plurality of recommended beams, and different signal sequences correspond to different beam identifications of the plurality of recommended beams.

Optionally, the sequence transmitting circuitry is configured to transmit the plurality of recommended beam signal sequences to the network in any way of: transmitting the plurality of signal sequences corresponding to the beam identifications of the plurality of recommended beams sequentially in a time domain; and transmitting the plurality of signal sequences corresponding to the beam identifications of the plurality of recommended beams alternately in the time domain.

Optionally, the sequence transmitting circuitry is configured to transmit the plurality of recommended beam signal sequences to the network in any way of: transmitting the plurality of signal sequences corresponding to the beam identifications of the plurality of recommended beams sequentially in a frequency domain; and transmitting the plurality of signal sequences corresponding to the beam identifications of the plurality of recommended beams alternately in the frequency domain.

Optionally, the plurality of signal sequences corresponding to the beam identifications of the plurality of recommended beams may include at least one of root sequences and sequences generated by root sequences.

Optionally, the beam identifications may include beam indexes.

Optionally, a priority order may be set among the plurality of recommended beams.

Compared with the prior art, the technical proposals of the present disclosure have the following beneficial effects.

In embodiments of the present disclosure, when a terminal determines that signal quality of a designated beam is not suitable for control channel transmission, a beam measurement is performed to determine a plurality of recommended beams, and beam identifications of the plurality of recommended beams are reported to a network. Therefore, the network can obtain the beam identifications of the plurality of recommended beams, and can change the designated beams to the plurality of recommended beams and can transmit data to the terminal using the recommended beams. Since the plurality of recommended beams are determined by the terminal via measurement, the network has a higher success rate of beam failure recovery using the plurality of recommended beams. In addition, since the terminal reports the beam identifications of the plurality of recommended beams to the network, the network can make a more flexible selection among the plurality of recommended beams, thereby increasing a success rate of beam failure recovery.

Further, beam failure recovery request information is obtained by encoding and modulating the beam identifications, and the beam identifications of the plurality of recommended beams are indicated to the network in an information form, which can reduce an occupation of network resources.

Further, the recommended beam signal sequences are determined based on the beam identifications of the plurality of recommended beams, and the beam identifications of the plurality of recommended beams are indicated to the network in a signal sequence form, and the network can obtain the beam identifications without other reference signals, thereby reducing calculation amount and simplifying a process of indicating the plurality of recommended beams to the network.

Further, when the beam identifications of the plurality of recommendation beams are indicated to the network in the form of signal sequences, a preset signal sequence can be cyclically shifted to obtain a plurality of shift signal sequences, and different shift signal sequences correspond to different recommended beams. Each of the plurality of shift signal sequences obtained by cyclically shifting the same signal sequence is orthogonal, a plurality of signal sequences obtained by mixing the plurality of shift signal sequences are also orthogonal, and the network can obtain beam identifications of a plurality of recommendation beams based on the mixed plurality of shift signal sequences, which can save the network resources.

Further, when the beam identifications of the plurality of recommendation beams are indicated to the network in the signal sequence form, a plurality of signal sequences corresponding to the beam identifications of the plurality of recommended beams one by one can be determined, and different signal sequences correspond to different recommended beam identifications, which can reduce calculation amount of generating a signal sequence corresponding to the beam identification of each recommendation beam.

In addition, when the beam identifications of the plurality of recommendation beams are indicated to the network in the signal sequence form, and the plurality of signal sequences corresponding to the beam identifications of the plurality of recommended beams one by one are determined, the plurality of signal sequences corresponding to the beam identifications of the plurality of recommended beams can be transmitted sequentially in a time domain, or the plurality of signal sequences corresponding to the beam identifications of the plurality of recommended beams can be transmitted alternately in the time domain. Therefore, each signal sequence only indicates a beam identification of a recommendation beam, and reliability of indicating the beam identification to the network will be higher.

DETAILED DESCRIPTION

As described in the background art, in order to ensure a normal communication process, a beam alignment should be performed between a user equipment (UE) and a network. However, due to channel fluctuation, a suddenly block of a communication link, UE rotation and other factors, the UE and beams may be out of alignment, which will affect system performance. Without performing a beam failure recovery or failure in a beam failure recovery will result in wireless link failure and more latency. A success rate of existing beam failure recovery methods needs to be improved.

In embodiments of the present disclosure, when a terminal determines that signal quality of a designated beam is not suitable for control channel transmission, a beam measurement is performed to determine a plurality of recommended beams, and beam identifications of the plurality of recommended beams are reported to the network.

Therefore, the network can obtain the beam identifications of the plurality of recommended beams, and the network can change the designated beam based on the plurality of recommended beams and transmit data to the terminal using the recommended beams.

Since the plurality of recommended beams are determined by the terminal after the measurement, the network has a higher success rate of beam failure recovery using a beam in the plurality of recommended beams. Since the terminal reports the beam identifications of the plurality of recommended beams to the network, the network can make more flexible selections among the plurality of recommended beams, thereby further improving the success rate of beam failure recovery.

In order that the above objects, features and advantages of the present disclosure will become more apparent, specific embodiments of the present disclosure will be described in detail below with reference to the accompanying drawings.

Figure 1:
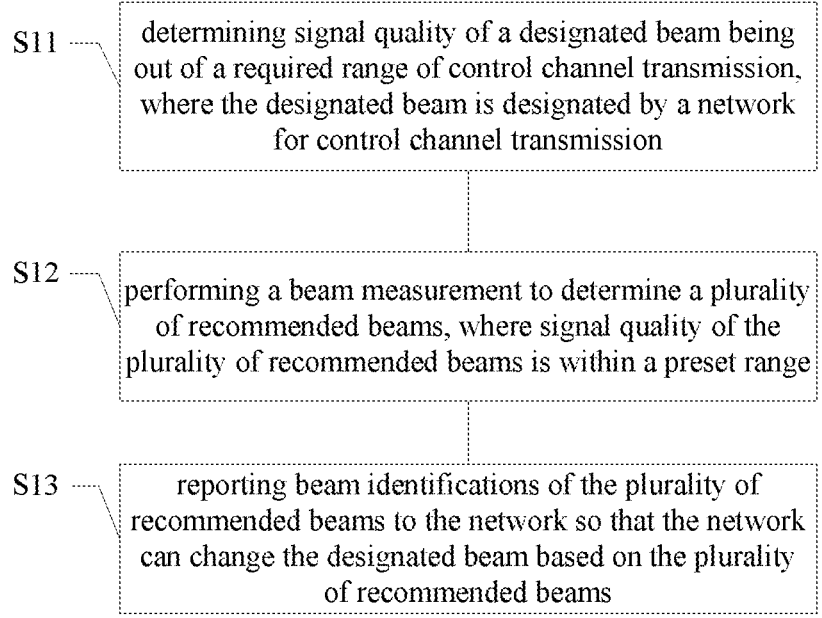
FIG. 1 schematically illustrates a flow chart of a method for beam failure recovery according to an embodiment.

FIG. 1 schematically illustrates a flow chart of a method for beam failure recovery according to an embodiment. The method may include the following steps.

In step S11, it is determined that, signal quality of a designated beam is out of a required range of control channel transmission, where the designated beam may be designated by a network for control channel transmission.

In step S12, a beam measurement is performed to determine a plurality of recommended beams, where signal quality of the plurality of recommended beams is within a preset range.

In step S13, beam identifications of the plurality of recommended beams are reported to the network, so that the network can change the designated beam based on the plurality of recommended beams. Specifically, the network may change the designated beam to one of the plurality of recommended beams. In other embodiments, the network may change the designated beam based on the plurality of recommended beams in other ways.

The steps S11 to S13 may be implemented by a terminal, and the terminal may measure and estimate a designated beam. When signal quality of the designated beam is out of a required range of control channel transmission, the terminal cannot perform beam communication with the network, and beam failure recovery is required.

The terminal may measure and estimate the designated beam via a control channel.

If no beam failure recovery or the beam failure recovery is failed, a wireless link will fail and the communication will be transferred to a Layer3 (L3) for processing, which may further bring in more latency and reduce communication efficiency.

The preset range in the step S12 may be set according to demands, and at least the control channel transmission requirements should be satisfied; and a higher signal quality threshold may be set to determine the preset range. When the preset range is relatively larger, more recommended beams can be obtained, and the network will have more choices. When the preset range is relatively smaller, beams will be recommended to the network more accurately.

The beam identifications of the recommended beams are applied to indicate the recommended beams to the network. Specifically, the beam identifications may be beam indexes, for example, Reference Signal (RS) indexes.

The user terminal obtains a plurality of recommended beams by measurement and reports the beam identifications of the plurality of recommended beams to the network. The network may select in beams identified by the beam identifications for beam failure recovery. The plurality of recommended beams can provide more choices for the network, which is beneficial to improve the success rate of beam failure recovery.

In some embodiment, the terminal may set a priority order among the plurality of recommended beams, and the priority order may be determined based on signal quality of each of the plurality of recommended beams obtained by the terminal via measurement. The network may attempt beam failure recovery according to the priority order. In this way, an efficiency of beam failure recovery can be improved and computation amount of the network can be reduced.

In order to realize reporting the beam identifications of the plurality of recommended beams to the network in the step S13, two methods are described according to embodiments of the present disclosure. One is to report to the network in an information form in the communication system, and the other is to report to the network in a signal sequence form.

The information in the communication system is obtained by encoding and modulating, and the beam identifications of the plurality of recommended beams are reported to the network in the information form, which can reduce an occupation of communication resources; and the network can directly decode a signal sequence and obtain the signal sequence's content, therefore by reporting beam identifications of the plurality of recommended beams to the network in the signal sequence form, complexity and calculation amount of the network can be reduced. The two methods will be described in detail below.

Figure 2:
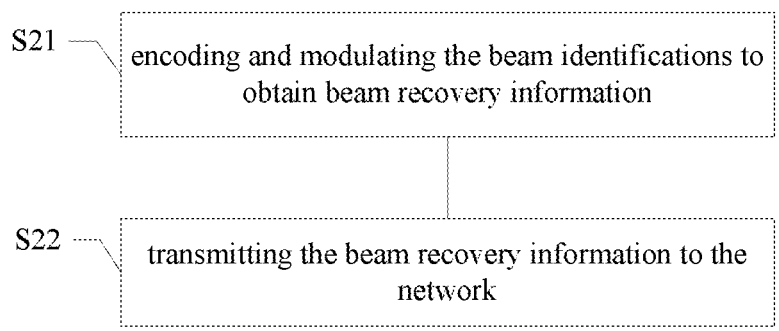
FIG. 2 schematically illustrates a flow chart of a method for realizing a step S13 in FIG. 1 according to an embodiment.

FIG. 2 schematically illustrates a flow chart of a method for realizing the step S13 in FIG. 1 according to an embodiment. Reporting the beam identifications to the network in the form of information may include the following steps.

In step S21, the beam identifications are encoded and modulated to obtain beam failure recovery request information.

In step S22, the beam failure recovery request information is transmitted to the network.

Since the beam failure recovery request information is encoded and modulated, time-frequency resources of the communication system are less occupied.

The beam failure recovery request information may further include a flag bit to indicate that current information indicates the beam identifications of the plurality of recommended beams, and that the flag bit can be encoded and modulated together with the beam identifications.

The beam failure recovery request information may be control information or data information. When the beam failure recovery request information is the control information, the beam failure recovery request information may be transmitted to the network through a control channel; and when the beam failure recovery request information is data information, the beam failure recovery request information may be transmitted to the network through a data channel.

Figure 3:
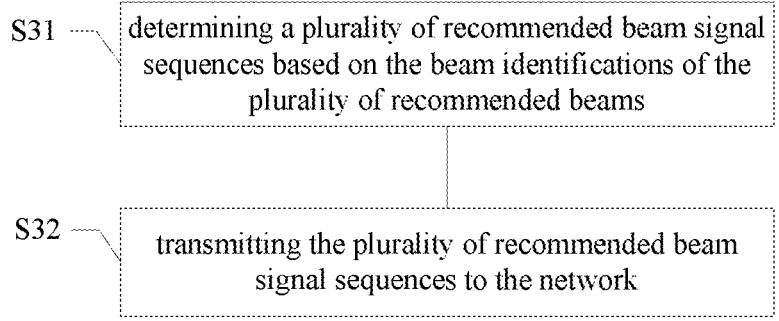
FIG. 3 schematically illustrates a flow chart of a method for realizing a step S13 in FIG. 1 according to another embodiment.

FIG. 3 schematically illustrates a flow chart of a method for realizing the step S13 in FIG. 1 according to another embodiment. Reporting the beam identifications of the plurality of recommended beams to the network in a signal sequence form may include the following steps.

In step S31, a plurality of recommended beam signal sequences are determined based on the beam identifications of the plurality of recommended beams.

In step S32, the plurality of recommended beam signal sequences are transmitted to the network.

The signal sequence is different from the information. The network normally demodulates the information in conjunction with a reference signal, while the network can directly obtain content of a signal sequence without other signals. Therefore, burden on the network can be reduced and efficiency of the network can be improved by reporting beam identifications of the plurality of recommended beams to the network in the signal sequence form.

Figure 4:
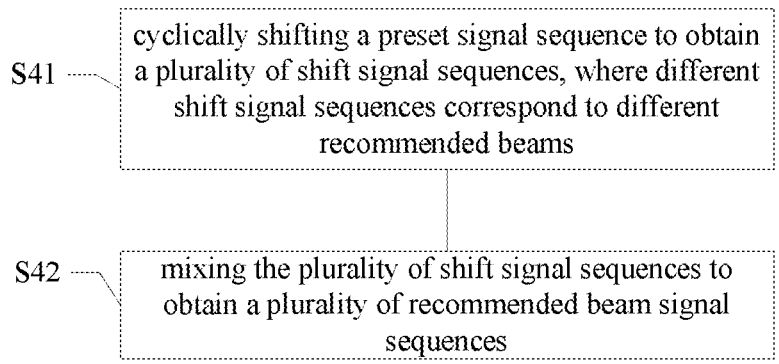
FIG. 4 schematically illustrates a flow chart of a method for realizing a step S31 in FIG. 3 according to an embodiment.

FIG. 4 schematically illustrates a flow chart of a method for realizing the step S31 in FIG. 3 according to an embodiment, and the method may include the following steps.

In step S41, a preset signal sequence is cyclically shifted to obtain a plurality of shift signal sequences, and different shift signal sequences may correspond to different recommended beams.

In step S42, the plurality of shift signal sequences are mixed to obtain a plurality of recommended beam signal sequences.

Each of the plurality of shift signal sequences obtained by cyclically shifting the same signal sequence is orthogonal, a plurality of signal sequences obtained by mixing the plurality of shift signal sequences are also orthogonal, and the network can obtain the beam identifications of the plurality of recommendation beams based on the mixed plurality of shift signal sequences, which can save network resources.

In another embodiment of the present disclosure, when the beam identifications of the plurality of recommended beams are indicated to the network in the signal sequence form, a plurality of signal sequences corresponding to the beam identifications of the plurality of recommended beams one by one can be determined, and different signal sequences correspond to different recommended beam identifications, which can reduce calculation amount of generating a signal sequence corresponding to the beam identification of each recommendation beam.

It will be appreciated by those skilled in the art that, a cyclic prefix (CP) may be transmitted before the signal sequence, when the beam identifications of the plurality of recommended beams are indicated to the network in the signal sequence form.

Further, the plurality of signal sequences corresponding to the beam identifications of the plurality of recommended beams one by one may be transmitted sequentially in a time domain, or the plurality of signal sequences corresponding to the beam identifications of the plurality of recommended beams may be transmitted alternately in the time domain. In this way, each signal sequence indicates only a beam identification of a recommendation beam, reliability of indicating the beam identification to the network will be higher.

In some embodiment, a user terminal may report two different beam identifications to a network, namely a first beam identification 1 and a second beam identification 2, respectively. A first signal sequence $S_1^1, S_1^2, S_1^3, S_1^4$ may correspond to the first beam identification 1, and a second signal sequence $S_2^1, S_2^2, S_2^3, S_2^4$ may correspond to the second beam identification 2.

Then, the signal sequences may be transmitted to the network in an order of CP, $S_1^1, S_1^2, S_1^3, S_1^4, S_2^1, S_2^2, S_2^3, S_2^4$ in a time domain, or the signal sequences may be transmitted to the network in an order of CP, $S_1^1, S_2^1, S_1^2, S_2^2, S_1^3, S_2^3, S_1^4, S_2^4$ or the signal sequences may be transmitted to the network in other continuous or alternate manner in the time domains.

In some embodiment, the plurality of signal sequences corresponding to the beam identifications of the plurality of recommended beams one by one may be transmitted sequentially in a frequency domain; or the plurality of signal sequences corresponding to the beam identifications of the plurality of recommended beams one by one may be transmitted alternately in the frequency domain.

In some embodiments, transmitting the plurality of signal sequences sequentially in the frequency domain may include transmitting the plurality of signal sequences using subcarriers ranging from low frequency to high frequency continuously, or using subcarriers ranging from high frequency to low frequency continuously; and the plurality of signal sequences may be transmitted continuously or alternately in the frequency domain using the manner as described in the above embodiments.

The plurality of signal sequences corresponding to the beam identifications of the plurality of recommended beams one by one may include at least one of root sequences and sequences generated by root sequences.

In embodiments of the present disclosure, when the terminal determines that signal quality of a designated beam is not suitable for control channel transmission, a beam measurement is performed to determine a plurality of recommended beams, and beam identifications of the plurality of recommended beams are reported to a network. Therefore, the network can obtain the beam identifications of the plurality of recommended beams, and can change the designated beam to one of the plurality of recommended beams and transmit data to the terminal using the one recommended beam. Since the plurality of recommended beams are determined by the terminal via measurement, the network has a higher success rate of beam failure recovery using the recommended beams. In addition, since the terminal reports the beam identifications of the plurality of recommended beams to the network, the network can make a more flexible selection among the plurality of recommended beams, thereby increasing a success rate of beam failure recovery.

Figure 5:
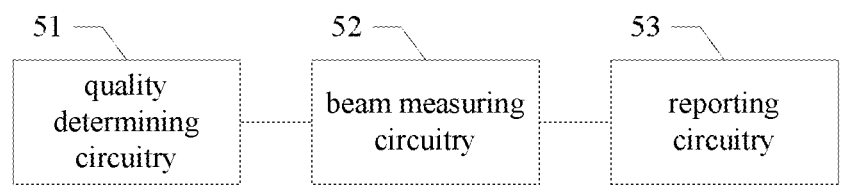
FIG. 5 schematically illustrates a structural diagram of a device for beam failure recovery according to an embodiment.

A device for beam failure recovery is also provided according to embodiments of the present disclosure. Referring to FIG. 5, FIG. 5 schematically illustrates a structural diagram of a device for beam failure recovery according to an embodiment. The device for beam failure recovery may include a quality determining circuitry 51, a beam measuring circuitry 52, and a reporting circuitry 53.

The quality determining circuitry 51 is configured to determine signal quality of a designated beam being out of a required range of control channel transmission, where the designated beam is designated by a network for control channel transmission.

The beam measuring circuitry 52 is configured to perform a beam measurement to determine a plurality of recommended beams, where signal quality of the plurality of recommended beams is within a preset range.

The reporting circuitry 53 is configured to report beam identifications of the plurality of recommended beams to the network, so that the network can change the designated beam based on the plurality of recommended beams. Specifically, the network may change the designated beam to one of the plurality of recommended beams. In other embodiments, the network may change the designated beam based on the plurality of recommended beams in other ways.

Figure 6:
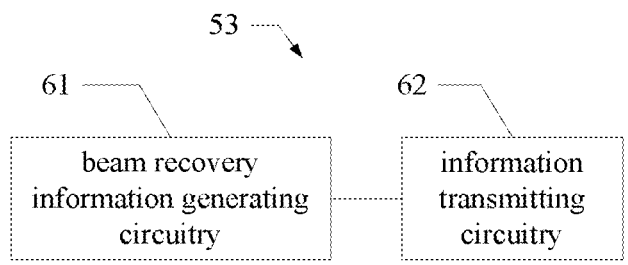
FIG. 6 schematically illustrates a structural diagram of a reporting circuitry according to an embodiment.

Referring to FIG. 6, FIG. 6 schematically illustrates a structural diagram of a reporting circuitry according to an embodiment. In some embodiments, the reporting circuitry 53 may include: a beam failure recovery request information generating circuitry 61 and an information transmitting circuitry 62.

The beam failure recovery request information generating circuitry 61 is configured to encode and modulate the beam identifications to obtain beam failure recovery request information.

The information transmitting circuitry 62 is configured to transmit the beam failure recovery request information to the network.

In some embodiment, the beam failure recovery request information may include control information or data information, and the reporting circuitry 53 (referring to FIG. 5) is configured to transmit the beam failure recovery request information to the network through a control channel or a data channel. When the beam failure recovery request information is the control information, the reporting circuitry 53 may transmit the beam failure recovery request information through the control channel; when the beam failure recovery request information is the data information, the reporting circuitry 53 may transmit the beam failure recovery request information through the data channel.

Figure 7:
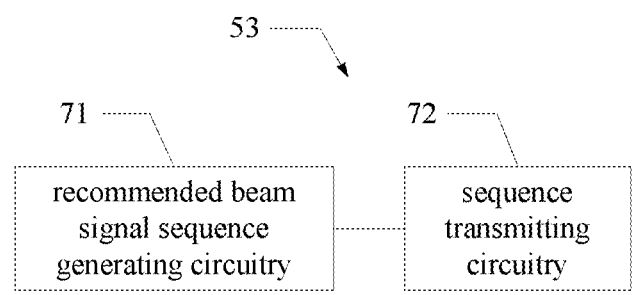
FIG. 7 schematically illustrates a structural diagram of a reporting circuitry according to another embodiment.

Referring to FIG. 7, FIG. 7 schematically illustrates a structural diagram of a reporting circuitry according to another embodiment. In some embodiment, the reporting circuitry 53 may include: a recommended beam signal sequence generating circuitry 71 and a sequence transmitting circuitry 72.

The recommended beam signal sequence generating circuitry 71 is configured to determine a plurality of recommended beam signal sequences based on the beam identifications of the plurality of recommended beams.

The sequence transmitting circuitry 72 is configured to transmit the plurality of recommended beam signal sequences to the network.

Figure 8:
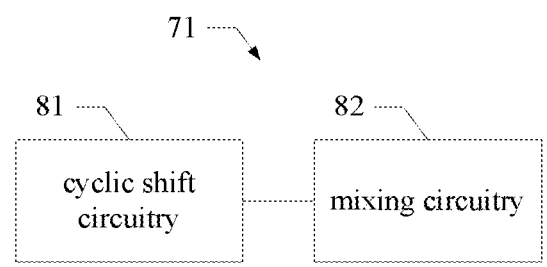
FIG. 8 schematically illustrates a structural diagram of a recommended beam signal sequence generating circuitry according to an embodiment.

Referring to FIG. 8, FIG. 8 schematically illustrates a structural diagram of a recommended beam signal sequence generating circuitry according to an embodiment. In some embodiments, the recommended beam signal sequence generating circuitry 71 may include a cyclic shift circuitry 81 and a mixing circuitry 82.

The cyclic shift circuitry 81 is configured to cyclically shift a preset signal sequence to obtain a plurality of shift signal sequences, and different shift signal sequences may correspond to different recommended beams.

The mixing circuitry 82 is configured to mix the plurality of shift signal sequences to obtain a plurality of recommended beam signal sequences.

In some embodiments, the recommended beam signal sequence generating circuitry 71 (shown in FIG. 7) is configured to determine a plurality of signal sequences as a plurality of recommended beam signal sequences, where there is a one-to-one correspondence between the plurality of signal sequences and the beam identifications of the plurality of recommended beams, and different signal sequences may correspond to different beam identifications of the plurality of recommended beams.

In some embodiment, the sequence transmitting circuitry 72 (shown in FIG. 7) may be configured to transmit the plurality of recommended beam signal sequences to the network in any of the following ways.

In a first way, the plurality of signal sequences corresponding to the beam identifications of the plurality of recommended beams may be transmitted sequentially in a time domain.

In a second way, the plurality of signal sequences corresponding to the beam identifications of the plurality of recommended beams may be transmitted alternately in the time domain.

The sequence transmitting circuitry 72 may be configured to transmit the plurality of recommended beam signal sequences to the network in any of the following ways.

In a first way, the plurality of signal sequences corresponding to the beam identifications of the plurality of recommended beams may be transmitted sequentially in a frequency domain.

In a second way, the plurality of signal sequences corresponding to the beam identifications of the plurality of recommended beams may be transmitted alternately in the frequency domain.

In some embodiments, the plurality of signal sequences corresponding to the beam identifications of the plurality of recommended beams may include at least one of root sequences and sequences generated by root sequences.

In some embodiments, the beam identifications may include beam indexes.

In some embodiments, a priority order may be set among the plurality of recommended beams.

The specific embodiments and beneficial effects of the device for beam failure recovery in the present disclosure may be referred to the aforementioned method for beam failure recovery, which will not be described in detail herein.

It will be understood by those of ordinary skill in the art that all or part of the processes in the method of the embodiments described above may be implemented by means of a computer program commanding associated hardware, where the computer program may be stored in a computer-readable storage medium. During execution of the program, procedures of embodiments as described above may be included. The storage medium may be a magnetic disk, an optical disk, a read-only memory (ROM), a random access memory (RAM), or the like.

Although the present disclosure has been described above, the present disclosure is not limited thereto. It should be understood by those skilled in the art that various changes and modifications may be made without departing from the spirit and scope of the disclosure, and therefore, the scope of the disclosure should be limited by the scope of the claims.

The invention claimed is:

1. A method for beam failure recovery, comprising:
   determining signal quality of a designated beam being out of a required range of control channel transmission, where the designated beam is designated by a network for control channel transmission;

performing a beam measurement to determine a plurality of recommended beams, where signal quality of the plurality of recommended beams is within a preset range; and reporting beam identifications of the plurality of recommended beams to the network, so that the network selects among the plurality of recommended beams identified by the beam identifications and changes the designated beam to one of the plurality of recommended beams for beam failure recovery.

2. The method according to claim 1, wherein reporting the beam identifications of the plurality of recommended beams to the network comprises:

encoding and modulating the beam identifications to obtain beam failure recovery request information; and transmitting the beam failure recovery request information to the network.

3. The method according to claim 2, wherein the beam failure recovery request information comprises control information or data information, and transmitting the beam failure recovery request information to the network comprises transmitting the beam failure recovery request information through a control channel or a data channel.

4. The method according to claim 1, wherein reporting the beam identifications of the plurality of recommended beams to the network comprises:

determining a plurality of recommended beam signal sequences based on the beam identifications of the plurality of recommended beams; and transmitting the plurality of recommended beam signal sequences to the network.

5. The method according to claim 4, wherein determining the plurality of recommended beam signal sequences based on the beam identifications of the plurality of recommended beams comprises:

cyclically shifting a preset signal sequence to obtain a plurality of shift signal sequences, where different shift signal sequences correspond to different recommended beams; and mixing the plurality of shift signal sequences to obtain the plurality of recommended beam signal sequences.

6. The method according to claim 4, wherein determining the plurality of recommended beam signal sequences based on the beam identifications of the plurality of recommended beams comprises:

determining a plurality of signal sequences as the plurality of recommended beam signal sequences, where there is a one-to-one correspondence between the plurality of signal sequences and the beam identifications of the plurality of recommended beams, and different signal sequences correspond to different beam identifications of the plurality of recommended beams.

7. The method according to claim 6, wherein transmitting the plurality of recommended beam signal sequences to the network comprises any of:

transmitting the plurality of signal sequences corresponding to the beam identifications of the plurality of recommended beams sequentially in a time domain; and transmitting the plurality of signal sequences corresponding to the beam identifications of the plurality of recommended beams alternately in the time domain.

8. The method according to claim 6, wherein transmitting the plurality of recommended beam signal sequences to the network comprises any of:

transmitting the plurality of signal sequences corresponding to the beam identifications of the plurality of recommended beams sequentially in a frequency domain; and transmitting the plurality of signal sequences corresponding to the beam identifications of the plurality of recommended beams alternately in the frequency domain.

9. The method according to claim 6, wherein the plurality of signal sequences corresponding to the beam identifications of the plurality of recommended beams comprise at least one of: root sequences and sequences generated by root sequences.

10. The method according to claim 1, wherein the beam identifications comprise beam indexes.

11. The method according to claim 1, wherein a priority order is set among the plurality of recommended beams.

12. A device for beam failure recovery, comprising:

a quality determining circuitry, configured to determine signal quality of a designated beam being out of a required range of control channel transmission, where the designated beam is designated by a network for control channel transmission;

a beam measuring circuitry, configured to perform a beam measurement to determine a plurality of recommended beams, where signal quality of the plurality of recommended beams is within a preset range; and a reporting circuitry, configured to report beam identifications of the plurality of recommended beams to the network, so that the network selects among the plurality of recommended beams identified by the beam identifications and changes the designated beam to one of the plurality of recommended beams for beam failure recovery.

13. The device according to claim 12, wherein the reporting circuitry comprises:

a beam failure recovery request information generating circuitry, configured to encode and modulate the beam identifications to obtain beam failure recovery request information; and an information transmitting circuitry, configured to transmit the beam failure recovery request information to the network.

14. The device according to claim 13, wherein the beam failure recovery request information comprises control information or data information, and the reporting circuitry is configured to transmit the beam failure recovery request information to the network through a control channel or a data channel.

15. The device according to claim 12, wherein the reporting circuitry comprises:

a recommended beam signal sequence generating circuitry, configured to determine a plurality of recommended beam signal sequences based on the beam identifications of the plurality of recommended beams; and a sequence transmitting circuitry, configured to transmit the plurality of recommended beam signal sequences to the network.

16. The device according to claim 15, wherein the recommended beam signal sequence generating circuitry comprises:

a cyclic shift circuitry, configured to cyclically shift a preset signal sequence to obtain a plurality of shift signal sequences, where different shift signal sequences correspond to different recommended beams; and a mixing circuitry, configured to mix the plurality of shift signal sequences to obtain the plurality of recommended beam signal sequences.

17. The device according to claim 15, wherein the recommended beam signal sequence generating circuitry is configured to determine a plurality of signal sequences as the plurality of recommended beam signal sequences, where there is a one-to-one correspondence between the plurality of signal sequences and the beam identifications of the plurality of recommended beams, and different signal sequences correspond to different beam identifications of the plurality of recommended beams.

18. The device according to claim 17, wherein the sequence transmitting circuitry is configured to transmit the plurality of recommended beam signal sequences to the network in any way of:
  transmitting the plurality of signal sequences corresponding to the beam identifications of the plurality of recommended beams sequentially in a time domain; and
  transmitting the plurality of signal sequences corresponding to the beam identifications of the plurality of recommended beams alternately in the time domain.

19. The device according to claim 17, wherein the sequence transmitting circuitry is configured to transmit the plurality of recommended beam signal sequences to the network in any way of:
  transmitting the plurality of signal sequences corresponding to the beam identifications of the plurality of recommended beams sequentially in a frequency domain; and
  transmitting the plurality of signal sequences corresponding to the beam identifications of the plurality of recommended beams alternately in the frequency domain.

20. The device according to claim 17, wherein the plurality of signal sequences corresponding to the beam identifications of the plurality of recommended beams comprise at least one of: root sequences and sequences generated by root sequences.

21. The device according to claim 12, wherein the beam identifications comprise beam indexes.

22. The device according to claim 12, wherein a priority order is set among the plurality of recommended beams.

* * * * *